United States Patent
Hong et al.

(10) Patent No.: US 12,490,235 B2
(45) Date of Patent: Dec. 2, 2025

(54) DELAY DETERMINATION METHOD AND APPARATUS, AND DELAY INSTRUCTION METHOD AND APPARATUS

(71) Applicant: Beijing Xiaomi Mobile Software Co., Ltd., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 340 days.

(21) Appl. No.: 18/035,402

(22) PCT Filed: Nov. 6, 2020

(86) PCT No.: PCT/CN2020/127244
§ 371 (c)(1),
(2) Date: May 4, 2023

(87) PCT Pub. No.: WO2022/094965
PCT Pub. Date: May 12, 2022

(65) Prior Publication Data
US 2023/0422209 A1    Dec. 28, 2023

(51) Int. Cl.
*H04W 68/02* (2009.01)
*H04W 68/00* (2009.01)

(52) U.S. Cl.
CPC ......... *H04W 68/02* (2013.01); *H04W 68/005* (2013.01)

(58) Field of Classification Search
CPC .... H04W 68/00; H04W 68/02; H04W 68/005
See application file for complete search history.

(56) References Cited

U.S. PATENT DOCUMENTS

| | | | |
|---|---|---|---|
| 5,797,097 A | 8/1998 | Roach, Jr. et al. | |
| 5,940,756 A * | 8/1999 | Sibecas | H04W 12/06 455/445 |
| 2009/0017845 A1* | 1/2009 | Wu | H04W 68/02 455/458 |
| 2020/0100210 A1* | 3/2020 | Vaidya | H04W 68/06 |
| 2020/0245292 A1 | 7/2020 | Huang et al. | |
| 2021/0345291 A1 | 11/2021 | Palenius et al. | |
| 2022/0248368 A1 | 8/2022 | Guttman et al. | |
| 2022/0286950 A1* | 9/2022 | Kumar | H04W 60/005 |
| 2022/0369211 A1* | 11/2022 | Agiwal | H04W 48/16 |
| 2023/0007624 A1* | 1/2023 | Murray | H04W 68/005 |
| 2023/0041176 A1* | 2/2023 | Liu | H04W 68/02 |

(Continued)

FOREIGN PATENT DOCUMENTS

| | | |
|---|---|---|
| CN | 103314624 A | 9/2013 |
| CN | 108834204 A | 11/2018 |

(Continued)

OTHER PUBLICATIONS

Yu Mingqiang, "CDMA network paging policy optimization exploration", Digital Communication, vol. 40, No. 4, Aug. 25, 2013, 4 pages.

(Continued)

*Primary Examiner* — Siu M Lee
(74) *Attorney, Agent, or Firm* — Volpe Koenig

(57) ABSTRACT

A delay determination method includes: in response to receiving busy instruction information from a terminal, delaying a determination process of stopping paging the terminal.

12 Claims, 4 Drawing Sheets

In response to receiving busy instruction information from a terminal, delay a determination process of stopping paging the terminal — S101

(56) References Cited

U.S. PATENT DOCUMENTS

2023/0051765 A1     2/2023   Ianev et al.
2023/0328688 A1*   10/2023   Kumar .................. H04W 60/00
                                                                                         455/458

FOREIGN PATENT DOCUMENTS

| CN | 109076352 A | 12/2018 |
| CN | 110505687 A | 11/2019 |
| GB | 202012159 | 9/2020 |
| WO | 2018176675 A1 | 10/2018 |
| WO | 2019/158778 A1 | 8/2019 |
| WO | 2020/076460 A1 | 4/2020 |

OTHER PUBLICATIONS

ISA State Intellectual Property Office of the People's Republic of China, Written Opinion of the International Searching Authority (Corrected Version) Issued in Application No. PCT/CN2020/127244, Aug. 4, 2022, WIPO, 6 pages.

ISA State Intellectual Property Office of the People's Republic of China, International Search Report Issued in Application No. PCT/CN2020/127244, Jul. 26, 2021, WIPO, 4 pages.

* cited by examiner

In response to receiving busy instruction information from a terminal, delay a determination process of stopping paging the terminal — S101

FIG. 1

In response to receiving busy instruction information from a terminal, delay expiration of a first timer, or delay expiration of a second timer — S201

FIG. 2

In response to receiving busy instruction information from a terminal, in response to determining that the first timer does not expire, pause or reset the first timer; or in response to determining that the second timer does not expire, pause or reset the second timer — S301

FIG. 3

In response to receiving busy instruction information from a terminal, in response to determining that the first timer does not expire, pause or reset the first timer; or in response to determining that the second timer does not expire, pause or reset the second timer — S301

↓

Each time the first timer is reset, increase the number of times of resending the paging signaling or the paging message by 1 — S401

FIG. 4

In response to receiving busy instruction information from a terminal, in response to determining that the first timer does not expire, pause or reset the first timer; or in response to determining that the second timer does not expire, pause or reset the second timer — S301

↓

In response to receiving a busy ending instruction from the terminal, start the first timer or the second timer — S501

FIG. 5

In response to receiving busy instruction information from a terminal, pause the first timer by the busy time length; or pause the second timer by the busy time length ~ S601

FIG. 6

Send busy instruction information to a core network; where the busy instruction information is used to instruct the core network to delay a determination process of stopping paging the terminal ~ S701

FIG. 7

In response to determining that an operation of the second SIM card in response to a paging signaling or a paging message conflicts with a communication operation performed by the first SIM card, send the busy instruction information to the core network corresponding to the second SIM card; where the busy instruction information is used to instruct the core network to delay a determination process of stopping paging the second SIM card ~ S801

FIG. 8

Send busy instruction information to a core network; where the busy instruction information is used to instruct the core network to delay a determination process of stopping paging the terminal ~ S701

Send a busy ending instruction to the core network, where the busy ending instruction is used to instruct the core network to start the first timer or the second timer ~ S901

Delay determination apparatus

Delaying module ~ 1001

FIG. 10

DELAY DETERMINATION METHOD AND APPARATUS, AND DELAY INSTRUCTION METHOD AND APPARATUS

CROSS-REFERENCE TO RELATED APPLICATION

This application is a National Stage of International Application No. PCT/CN2020/127244, filed on Nov. 6, 2020, the contents of all of which are incorporated herein by reference in their entirety.

TECHNICAL FIELD

The present disclosure relates to the field of communication technologies, and in particular to a delay determination method, a method of instructing a delay, a delay determination apparatus, an apparatus for instructing a delay, an electronic device and a computer-readable storage medium.

BACKGROUND

In a current paging mechanism, when a core network needs to page a terminal, the core network may send a paging signaling to an access stratum (AS) while a timer is enabled. Before the timer expires, if the core network receives a schedule request (SR) from the terminal, the timer may be stopped. If failing to receive a schedule request from the terminal upon expiration of the timer, the core network may stop paging.

However, in some cases, the terminal cannot send a schedule request to the core network not because the terminal goes beyond the coverage scope of the core network but because there are some reasons that disable the terminal from sending a schedule request to the core network. For example, when a subscriber identity module (SIM) card #1 in the terminal is in communication process and a SIM card #2 receives a paging signaling, sending a schedule request to the core network based on the paging signaling may affect a communication operation performed by the SIM card #1, and thus the SIM card #2 is disabled to send the schedule request to the core network.

In the above case, the SIM card #2 is not located outside the coverage scope of the core network or in a turned-off state. If paging is stopped in this case, the core network will not receive a schedule request from the SIM card #2 for a long time, affecting subsequent communication of the SIM card #2.

SUMMARY

In view of the above, the embodiments of the present disclosure provide a delay determination method, a method of instructing a delay, a delay determination apparatus, an apparatus for instructing a delay, an electronic device, and a computer-readable storage medium, so as to solve the technical problems of the related arts.

According to a first aspect of embodiments of the present disclosure, a delay determination method is provided, which is applied to a core network. The method includes: in response to receiving busy instruction information from a terminal, delaying the determination process of stopping paging the terminal.

According to a second aspect of embodiments of the present disclosure, there is provided a method of instructing a delay, which is applied to a terminal. The method includes: sending busy instruction information to a core network, where the busy instruction information is used to instruct the core network to delay a determination process of stopping paging the terminal.

According to a third aspect of embodiments of the present disclosure, there is provided a delay determination apparatus, which is applied to a core network. The apparatus includes: a delaying module, configured to, in response to receiving busy instruction information from a terminal, delay a determination process of stopping paging the terminal.

According to a fourth aspect of embodiments of the present disclosure, there is provided an apparatus for instructing a delay, which is applied to a terminal. The apparatus includes: an instructing module, configured to send busy instruction information to a core network; where the busy instruction information is used to instruct the core network to delay a determination process of stopping paging the terminal.

According to a fifth aspect of embodiments of the present disclosure, there is provided an electronic device, including: a processor; and a memory storing instructions executable by the processor. Where the processor is configured to perform the above-mentioned delay determination method and/or the above-mentioned method of instructing a delay.

According to a sixth aspect of embodiments of the present disclosure, there is provided a computer-readable storage medium, storing computer programs thereon, where the programs are executed by a processor to perform the steps in the above-mentioned delay determination method and/or the above-mentioned method of instructing a delay.

BRIEF DESCRIPTION OF THE DRAWINGS

In order to make the technical solutions of the embodiments of the present disclosure clearer, the accompanying drawings involved in the descriptions of the embodiments will be briefly introduced below. It is apparent that the drawings described below are merely some embodiments of the present disclosure and other drawings may be obtained by those of ordinary skill in the prior art based on these drawings in the embodiments of the present disclosure.

FIG. 1 is a schematic flowchart illustrating a delay determination method according to an embodiment of the present disclosure.

FIG. 2 is a schematic flowchart illustrating a delay determination method according to another embodiment of the present disclosure.

FIG. 3 is a schematic flowchart illustrating a delay determination method according to yet another embodiment of the present disclosure.

FIG. 4 is a schematic flowchart illustrating a delay determination method according to still another embodiment of the present disclosure.

FIG. 5 is a schematic flowchart illustrating a delay determination method according to still another embodiment of the present disclosure.

FIG. 6 is a schematic flowchart illustrating a delay determination method according to still another embodiment of the present disclosure.

FIG. 7 is a schematic flowchart illustrating a method of instructing a delay according to an embodiment of the present disclosure.

FIG. 8 is a schematic flowchart illustrating a method of instructing a delay according to another embodiment of the present disclosure.

FIG. 9 is a schematic flowchart illustrating a method of instructing a delay according to yet another embodiment of the present disclosure.

FIG. 10 is a schematic block diagram illustrating a delay determination apparatus according to an embodiment of the present disclosure.

DETAILED DESCRIPTION OF THE EMBODIMENTS

Figure 11:
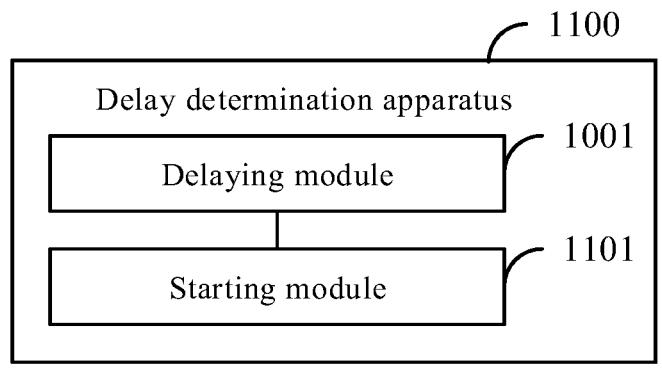
FIG. 11 is a schematic block diagram illustrating a delay determination apparatus according to another embodiment of the present disclosure.

The technical solutions of the embodiments of the present disclosure will be fully and clearly described below in combination with the accompanying drawings in the embodiments of the present disclosure. Apparently, the embodiments described herein are merely some embodiments of the present disclosure rather than all embodiments. Other embodiments obtained by those skilled in the art based on these embodiments without making creative work shall all fall within the scope of protection of the present disclosure.

FIG. 1 is a schematic flowchart illustrating a delay determination method according to an embodiment of the present disclosure. The delay determination method shown in this embodiment is applied to a core network. The core network may be a 4th generation (4G) core network, a 5th generation (5G) core network, a 6th generation (6G) core network and the like. The core network may communicate with a terminal, for example, directly or through a base station. The terminal may include but not limited to a smartphone, a tablet computer, a wearable device, a sensor, an internet-of-things device and the like. In an embodiment, the base station may be a terminal to which a method of instructing a delay provided in any of the subsequent embodiments is applicable.

As shown in FIG. 1, the delay determination method may include the following step S101.

At step S101, in response to receiving busy instruction information from a terminal, the determination process of stopping paging the terminal is delayed.

In an embodiment, the terminal may send busy instruction information to the core network based on requirements. For example, the terminal may send the busy instruction information first to a base station through an access stratum, and then the base station sends the busy instruction information to the core network, or the busy instruction information is directly sent to the core network through a non-access stratum.

In the embodiments of the present disclosure, the terminal may send the busy instruction information to the core network based on requirements so as to instruct the core network to delay the determination process of stopping paging the terminal. Thus, the core network may continue paging the terminal such that when not busy subsequently, the terminal can send a schedule request to the core network in time based on the received paging signaling.

For example, when the terminal is located within the coverage scope of the core network, although the terminal receives a paging signaling from the core network, the terminal cannot send a schedule request to the core network in time for the paging signaling for some reasons. The paging signaling may specifically be a paging request or a paging message.

For example, a processing capability of the terminal is occupied and hence, the terminal is unable to send a schedule request to the core network; or, a communication resource of the terminal is occupied, and hence, the terminal has no communication resource to send a schedule request to the core network.

In an embodiment of the present disclosure, the terminal may send busy instruction information to the core network based on requirements to instruct the core network to delay the determination process of stopping paging the terminal. In this case, the core network may continue paging the terminal such that the terminal may, when not busy subsequently, send a schedule request to the core network in time based on the received paging signaling.

In an embodiment, a plurality of SIM cards may be disposed in the terminal, and the plurality of SIM cards include at least a first SIM card and a second SIM card. The first SIM card and the second SIM card may belong to a same operator network or different operator networks.

For example, the SIM cards described in all the embodiments of the present disclosure may be conventional SIM cards or embedded-SIM (ESIM) cards.

In an embodiment, when the first SIM card performs a communication operation and the second SIM card receives the paging signaling from the core network. If the second SIM card does not send a schedule request to the core network for the received paging signaling based on settings of the terminal or network-side configurations, the second SIM card may send the busy instruction information to the core network to instruct the core network to delay the determination process of stopping paging the second SIM card.

The core network may implement the determination process of stopping to page the terminal (e.g., the second SIM card) based on a first timer or a second timer. The first timer may be a timer T3413 (e.g., the core network is a 4G core network), or a timer T3513 (e.g., the core network is a 5G core network). The second timer may be a timer T3415.

The two timers are illustrated respectively below.

FIG. 2 is a schematic flowchart illustrating a delay determination method according to another embodiment of the present disclosure. As shown in FIG. 2, delaying the determination process of stopping paging the terminal may include the following step, S201.

At step S201, expiration of the first timer is delayed, where the expiration of the first timer triggers the core network to resend a paging signaling or a paging message to the terminal; or, expiration of the second timer is delayed, where the expiration of the second timer triggers the core network to stop sending a paging signaling or a paging message to the terminal.

In an embodiment, with the first timer as an example, delaying the determination process of stopping paging the terminal by the core network may specifically include: delaying the expiration of the first timer. Since the expiration of the first timer is delayed, the counting operation for resending a paging is also delayed, and thus, the action of the core network for stopping sending a paging signaling or a paging message to the terminal after a count value reaches a target number of times is also delayed.

In an embodiment, with the second timer as an example, delaying the determination process of stopping paging the terminal by the core network may specifically include delaying the expiration of the second timer. Since the expiration of the second timer is delayed, and thus, the action of the core network for stopping sending a paging signaling or a paging message to the terminal after the second timer expires is also delayed.

In an embodiment, an expiration time length of the first timer may be less than or equal to an expiration time length of the second timer.

In an embodiment, when a number of times of resending a paging signaling or a paging message reaches a target number of times, the core network stops sending the paging signaling or the paging message to the terminal.

In an embodiment, when a number of times of resending the paging signaling or the paging message reaches a target number of times (N3413 for the timer T3413, and N3513 for the timer T3513), the core network may stop sending the paging signaling or the paging message to the terminal.

In an embodiment, the target number of times may also be controlled by a time length of a timer. For example, a third timer for controlling the number of times of resending the paging signaling or the paging message is disposed, where the time length of the third timer is greater than the time length of the first timer. When the paging signaling or the paging message is sent for the first time, the first timer and the third timer are started at the same time. Whenever the first timer expires, the paging signaling or paging message is resent. When the third timer expires, sending of the paging signaling or the paging message is stopped. In this way, the target number of times is determined by the third timer.

FIG. 3 is a schematic flowchart illustrating a delay determination method according to yet another embodiment of the present disclosure. As shown in FIG. 3, delaying the expiration of the first timer includes: at step S301, in response to determining that the first timer does not expire, pausing or resetting the first timer; or, delaying the expiration of the second timer includes: in response to determining that the second timer does not expire, pausing or resetting the second timer.

In an embodiment, for the first timer, the operation of delaying the expiration of the first timer may be pausing the first timer or resetting the first timer. It is first determined whether the first timer expires. When the first timer expires, even if the operation of pausing or resetting the first timer is performed, the effect of delaying the expiration of the first timer cannot be achieved. Therefore, if the first timer expires, it is not required to perform the operation of pausing or resetting the first timer so as to avoid wasting the resources of the core network. When the first timer does not expire, for example, when the first timer is already started but does not expire, the operation of pausing or resetting the first timer can be performed.

In an embodiment, for the second timer, the operation of delaying the expiration of the second timer may be pausing the second timer or resetting the second timer. It is first determined whether the second timer expires. When the second timer expires, even if the operation of pausing or resetting the second timer is performed, the effect of delaying the expiration of the second timer cannot be achieved. Therefore, if the second timer expires, it is not required to perform the operation of pausing or resetting the second timer so as to avoid wasting the resources of the core network. When the second timer does not expire, for example, when the second timer is already started but does not expire, the operation of pausing or resetting the second timer can be performed.

It is to be noted that the operation of resetting the timer in all the embodiments of the present disclosure may be resetting a time counting value of the timer to 0 and pausing the time counting of the timer.

FIG. 4 is a schematic flowchart illustrating a delay determination method according to still another embodiment of the present disclosure. As shown in FIG. 4, delaying the expiration of the first timer includes step S301 and the following step, S401.

At step S401, each time the first timer is reset, the number of times the paging signaling or the paging message is resent is increased by 1.

In an embodiment, for the first timer, upon each reset of the first timer, the number of times the paging signaling or paging message is resent may be increased by 1. Thus, when the first timer is reset a large number of times, if the number of times of resending the paging signaling or the paging message reaches a target number of times, the operation of continuing to send the paging signaling or the paging message and continuing to reset the first timer is stopped to avoid resetting the first timer for too many times.

FIG. 5 is a schematic flowchart illustrating a delay determination method according to still another embodiment of the present disclosure. As shown in FIG. 5, the method includes S301 and further includes the following step, S501.

At step S501, in response to receiving a busy ending instruction from the terminal, the first timer or the second timer is started.

In an embodiment, after determining that the busy state has ended, the terminal may also send a busy ending instruction to the core network, for example, send a busy ending instruction to the core network through the second SIM card. If the core network pauses or resets the first timer, the core network may, after receiving the busy ending instruction, start the first timer, so as to continue counting time or recount time through the first timer. When the first timer is paused, starting the first timer means that it continues counting time from the time point of pause. For example, the timing length of the timer is 10 ms, if the timer is paused at the time of counting to 6 ms, starting the timer after the pause means that the timer is enabled to continue counting from 6 ms. In an example, when the first timer is reset, starting the first timer means that the reset timer resets time. For example, the timing length of the timer is 10 ms, if the timer is reset at the time of counting to 6 ms, starting the timer after resetting means that the timer counts time from 0 ms. If pausing or resetting the second timer, the core network may, after receiving the busy ending instruction, restart the second timer, so as to continue counting time or recount time through the second timer. The meaning of starting the second timer is similar to the meaning of starting the first timer and thus will not be repeated herein.

In an embodiment, the above-mentioned busy instruction information may occupy one bit and the busy ending instruction may also occupy one bit, and thus, the data volume is less than that required for sending a schedule request. Hence, when the terminal is unable to send a schedule request, the terminal may send the busy instruction information and the busy ending instruction to the core network through other information.

FIG. 6 is a schematic flowchart illustrating a delay determination method according to still another embodiment of the present disclosure. As shown in FIG. 6, the busy instruction information carries a busy time length, and delaying the expiration of the first timer includes: at step S601, pausing the first timer by the busy time length; or, delaying the expiration of the second timer includes: pausing the second timer by the busy time length.

In an embodiment, the terminal may estimate the busy time length, store it in the busy instruction information, and then send the busy instruction information to the core network. Thus, the core network may accurately pause the first timer by the busy time length or pause the second timer by the busy time length, so as to avoid excessively delaying the expiration of the timer. After the pause, the time counting process of the timer can be continued.

FIG. 7 is a schematic flowchart illustrating a method of instructing a delay according to an embodiment of the present disclosure. The method of instructing a delay shown in this embodiment may be applied to a terminal. The terminal may include but is not limited to a smart phone, a tablet computer, a wearable device, a sensor, an internet-of-things device and the like. The terminal may communicate with a core network, and the core network may include but not be limited to a 4G core network, a 5G core network, a 6G core network and the like. In an embodiment, the core network may be a core network to which the delay determination method provided by any one of the above embodiments is applied.

As shown in FIG. 7, the method of instructing a delay may include the following step, S701.

At step S701, busy instruction information is sent to the core network. The busy instruction information is used to instruct the core network to delay a determination process of stopping paging the terminal.

In an embodiment, the terminal may send busy instruction information to the core network based on requirements. For example, the terminal may send the busy instruction information first to a base station through an access stratum, and then the base station sends the busy instruction information to the core network, or the busy instruction information is directly sent to the core network through a non-access stratum.

For example, when the terminal is located within the coverage scope of the core network, although the terminal receives a paging signaling from the core network, the terminal cannot send a schedule request to the core network in time for the paging signaling for some reasons. The paging signaling may specifically be a paging request or a paging message.

For example, a processing capability of the terminal is occupied and hence, the terminal is unable to send a schedule request to the core network; or, a communication resource of the terminal is occupied, and hence, the terminal has no communication resource to send a schedule request to the core network.

In an embodiment of the present disclosure, the terminal may send busy instruction information to the core network based on requirements to instruct the core network to delay a determination process of stopping paging the terminal. In this case, the core network may continue paging the terminal such that the terminal may, when not busy subsequently send a schedule request to the core network in time based on the received paging signaling.

FIG. 8 is a schematic flowchart illustrating a method of instructing a delay according to another embodiment of the present disclosure. As shown in FIG. 8, at least a first SIM card and a second SIM card are disposed in the terminal. Sending the busy instruction information to the core network includes the following step, S801.

At step S801, in response to determining that an operation of the second SIM card in response to a paging signaling or a paging message conflicts with a communication operation performed by the first SIM card, the busy instruction information is sent to the core network corresponding to the second SIM card. The busy instruction information is used to instruct the core network to delay the determination process of stopping paging the second SIM card.

In an embodiment, a plurality of SIM cards may be disposed in the terminal, and the plurality of SIM cards includes at least a first SIM card and a second SIM card. The first SIM card and the second SIM card may belong to the same operator network or different operator networks.

For example, the SIM cards described in all the embodiments of the present disclosure may be conventional SIM cards or ESIM cards.

In an embodiment, when the first SIM card is performing a communication operation and the second SIM card receives the paging signaling or the paging message from the core network, if the second SIM card does not send a schedule request to the core network for the received paging signaling or a paging message based on settings of the terminal or network-side configurations, the second SIM card may send busy instruction information to the core network to instruct the core network to delay a determination process of stopping paging the second SIM card.

The core network may implement the determination process of stopping paging the terminal (e.g., the second SIM card) based on a first timer or a second timer. The first timer may be a timer T3413 (e.g., the core network is a 4G core network), or a timer T3513 (e.g., the core network is a 5G core network). The second timer may be a timer T3415.

The two timers are illustrated respectively below.

In an embodiment, the busy instruction information is used to instruct the core network to delay the expiration of the first timer or the expiration of the second timer.

The expiration of the first timer triggers the core network to resend the paging signaling or the paging message to the terminal; the expiration of the second timer triggers the core network to stop sending the paging signaling or the paging message to the terminal.

In an embodiment, with the first timer as an example, the busy instruction information may instruct the core network to delay the expiration of the first timer. Since the expiration of the first timer is delayed, the counting operation for resending a paging is also delayed, and thus, the action of the core network for stopping sending the paging signaling or the paging message to the terminal is also delayed after a count value reaches a target number of times.

In an embodiment, with the second timer as an example, the busy instruction information may instruct the core network to delay the expiration of the second timer. Since the expiration of the second timer is delayed, and thus, the action of the core network for stopping sending a paging signaling or a paging message to the terminal after the second timer expires is also delayed.

In an embodiment, when the number of times of resending a paging signaling or a paging message reaches a target number of times, the core network stops sending the paging signaling or the paging message to the terminal.

In an embodiment, the busy instruction information is used to instruct the core network to pause or reset the first timer or to instruct the core network to pause or reset the second timer.

In an embodiment, for the first timer, the busy instruction information may specifically instruct the pause or reset of the first timer. The core network may first determine whether the first timer expires. When the first timer expires, even if the operation of pausing or resetting the first timer is performed, the effect of delaying the expiration of the first timer cannot be achieved. Therefore, if the first timer expires, it is not required to perform the operation of pausing or resetting the first timer so as to avoid wasting the resources of the core network. When the first timer does not expire, for example, when the first timer is already started but does not expire, the operation of pausing or resetting the first timer can be performed.

In an embodiment, for the second timer, the busy instruction information may specifically instruct the pause or reset of the second timer. The core network may first determine whether the second timer expires. When the second timer expires, even if the operation of pausing or resetting the second timer is performed, the effect of delaying the expiration of the second timer cannot be achieved. Therefore, if the second timer expires, it is not required to perform the operation of pausing or resetting the second timer so as to avoid wasting the resources of the core network. When the second timer does not expire, for example, when the second timer is already started but does not expire, the operation of pausing or resetting the second timer can be performed.

FIG. 9 is a schematic flowchart illustrating a method of instructing a delay according to yet another embodiment of the present disclosure. As shown in FIG. 9, the method includes the following steps: S701 and S901.

At step S901, a busy ending instruction is sent to the core network, where the busy ending instruction is used to instruct the core network to start the first timer or the second timer.

In an embodiment, after determining that the busy state has ended, the terminal may also send a busy ending instruction to the core network, for example, by sending a busy ending instruction to the core network through the second SIM card. If the core network pauses or resets the first timer, the core network may, after receiving the busy ending instruction, start the first timer, so as to continue counting time through the first timer. When pausing or resetting the second timer, the core network may, after receiving the busy ending instruction, start the second timer, so as to continue counting time through the second timer.

In an embodiment, the above-mentioned busy instruction information may occupy one bit, and the busy ending instruction may also occupy one bit, and thus, the data volume is less than that required for sending a schedule request. Hence, when the terminal is unable to send a schedule request, the terminal may send the busy instruction information and the busy ending instruction to the core network through other information.

In an embodiment, the busy instruction information includes a busy time length, and the busy instruction information is used to instruct the core network to pause the first timer by the busy time length or pause the second timer by the busy time length.

In an embodiment, the terminal may estimate the busy time length and store it in the busy instruction information, then send the busy instruction information to the core network. Thus, the core network may accurately pause the first timer by the busy time length or pause the second timer by the busy time length, so as to avoid excessively delaying the expiration of the timer. After the pause, the time counting process of the timer can be continued.

Corresponding to the embodiments of the above-mentioned delay determination method and the method of instructing a delay, the present disclosure further provides embodiments of a delay determination apparatus and an apparatus for instructing a delay.

FIG. 10 is a schematic block diagram illustrating a delay determination apparatus 1000 according to an embodiment of the present disclosure. The delay determination apparatus 1000 shown in this embodiment is applied to a core network. The core network may be a 4G core network, a 5G core network, a 6G core network and the like. The core network may communicate with a terminal, for example, directly or through a base station. The terminal may include, but is not limited to, a smartphone, a tablet computer, a wearable device, a sensor, an internet-of-things device, and the like. In an embodiment, the base station may be a terminal to which an apparatus for instructing a delay provided by an embodiment of the present disclosure is applied subsequently.

As shown in FIG. 10, the delay determination apparatus 1000 may include a delaying module 1001, configured to, in response to determining that busy instruction information from the terminal is received, delay a determination process of stopping paging the terminal.

In an embodiment, the delaying module is configured to delay expiration of a first timer, where the expiration of the first timer triggers the core network to resend a paging signaling or a paging message to the terminal; or delay expiration of a second timer, where the expiration of the second timer triggers the core network to stop sending a paging signaling or a paging message to the terminal.

In an embodiment, when the number of times of resending a paging signaling or a paging message reaches a target number of times, the core network stops sending the paging signaling or the paging message to the terminal.

In an embodiment, the delaying module is configured to, in response to determining that the first timer has not expired, pause or reset the first timer; or, in response to determining that the second timer has not expired, pause or reset the second timer.

In an embodiment, the delaying module is further configured to, upon each reset of the first timer, increase the number of times the paging signaling or paging message is resent by 1.

FIG. 11 is a schematic block diagram illustrating a delay determination apparatus 1100 according to another embodiment of the present disclosure. As shown in FIG. 11, the apparatus 1100 includes the delaying module 1001 and further includes: a starting module 1101, configured to, in response to receiving a busy ending instruction from the terminal, start the first timer or the second timer.

In an embodiment, the busy instruction information carries a busy time length and the delaying module 1001 is configured to pause the first timer by the busy time length or pause the second timer by the busy time length.

Figure 12:
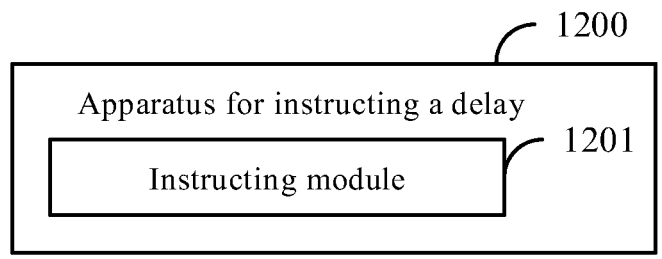
FIG. 12 is a schematic block diagram illustrating an apparatus for instructing a delay according to an embodiment of the present disclosure.

FIG. 12 is a schematic block diagram illustrating an apparatus for instructing a delay 1200 according to an embodiment of the present disclosure. The apparatus for instructing a delay 1200 shown in this embodiment may be applied to a terminal. The terminal may include, but is not limited to, a smartphone, a tablet computer, a wearable device, a sensor, an internet-of-things device, and the like. The terminal may communicate with a core network, and the core network may include but not limited to a 4G core network, a 5G core network, a 6G core network, and the like. In an embodiment, the core network may be a core network to which the delay determination method provided by any one of the above embodiments is applied.

As shown in FIG. 12, the apparatus for instructing a delay 1200 may include: an instructing module 1201, configured to send busy instruction information to the core network.

The busy instruction information is used to instruct the core network to delay the determination process of stopping paging the terminal.

In an embodiment, at least a first SIM card and a second SIM card are disposed in the terminal. The instructing module is configured to, in response to determining that an operation of the second SIM card in response to the paging signaling or the paging message conflicts with a communication operation performed by the first SIM card, send the busy instruction information to the core network corresponding to the second SIM card.

The busy instruction information is used to instruct the core network to delay the determination process of stopping paging the second SIM card.

In an embodiment, the busy instruction information is used to instruct the core network to delay the expiration of either a first timer or a second timer.

The expiration of the first timer triggers the core network to resend the paging signaling or the paging message to the terminal. The expiration of the second timer triggers the core network to stop sending the paging signaling or the paging message to the terminal.

In an embodiment, a number of times of resending a paging signaling or a paging message reaches a target number of times, the core network may stop sending the paging signaling or the paging message to the terminal.

In an embodiment, the busy instruction information is used to instruct the core network to pause or reset the first timer or to instruct the core network to pause or reset the second timer.

Figure 13:
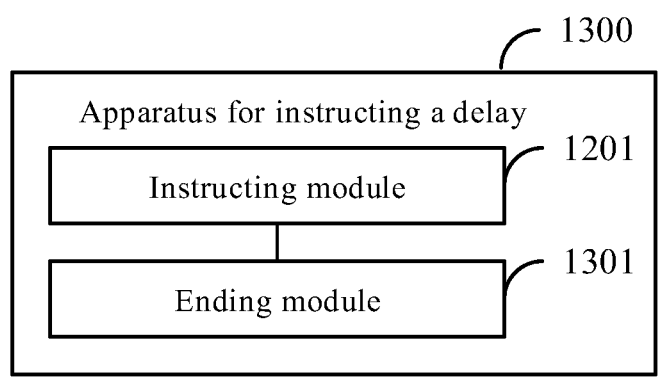
FIG. 13 is a schematic block diagram illustrating an apparatus for instructing a delay according to another embodiment of the present disclosure.

FIG. 13 is a schematic block diagram illustrating an apparatus for instructing a delay 1300 according to another embodiment of the present disclosure. As shown in FIG. 13, the apparatus 1300 includes the instructing module 1201 and further includes: an ending module 1301, configured to send a busy ending instruction to the core network, where the busy ending instruction is used to instruct the core network to start the first timer or the second timer.

In an embodiment, the busy instruction information includes a busy time length, and the busy instruction information is used to instruct the core network to pause the first timer by the busy time length or pause the second timer by the busy time length.

The specific manner in which each module in the apparatuses in the above embodiments performs operations has already been detailed in the method-related embodiments and will not be repeated herein.

Since the apparatus embodiments substantially correspond to the method embodiments, a reference may be made to part of the descriptions of the method embodiments for the related part. The apparatus embodiments described above are merely illustrative, where the modules described as separate members may or may not be physically separated, and the members displayed as modules may=or may not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry them out without creative work.

An embodiment of the present disclosure further provides an electronic device, including: a processor; and a memory storing instructions executable by the processor. Where the processor is configured to perform the delay determination method of any one of the above embodiments, and/or the method of instructing a delay of any one of the above embodiments.

An embodiment of the present disclosure further provides a computer-readable storage medium, storing computer programs thereon, where the programs are executed by a processor to perform the steps in the delay determination method of any one of the above embodiments, and/or the method of instructing a delay of any one of the above embodiments.

Figure 14:
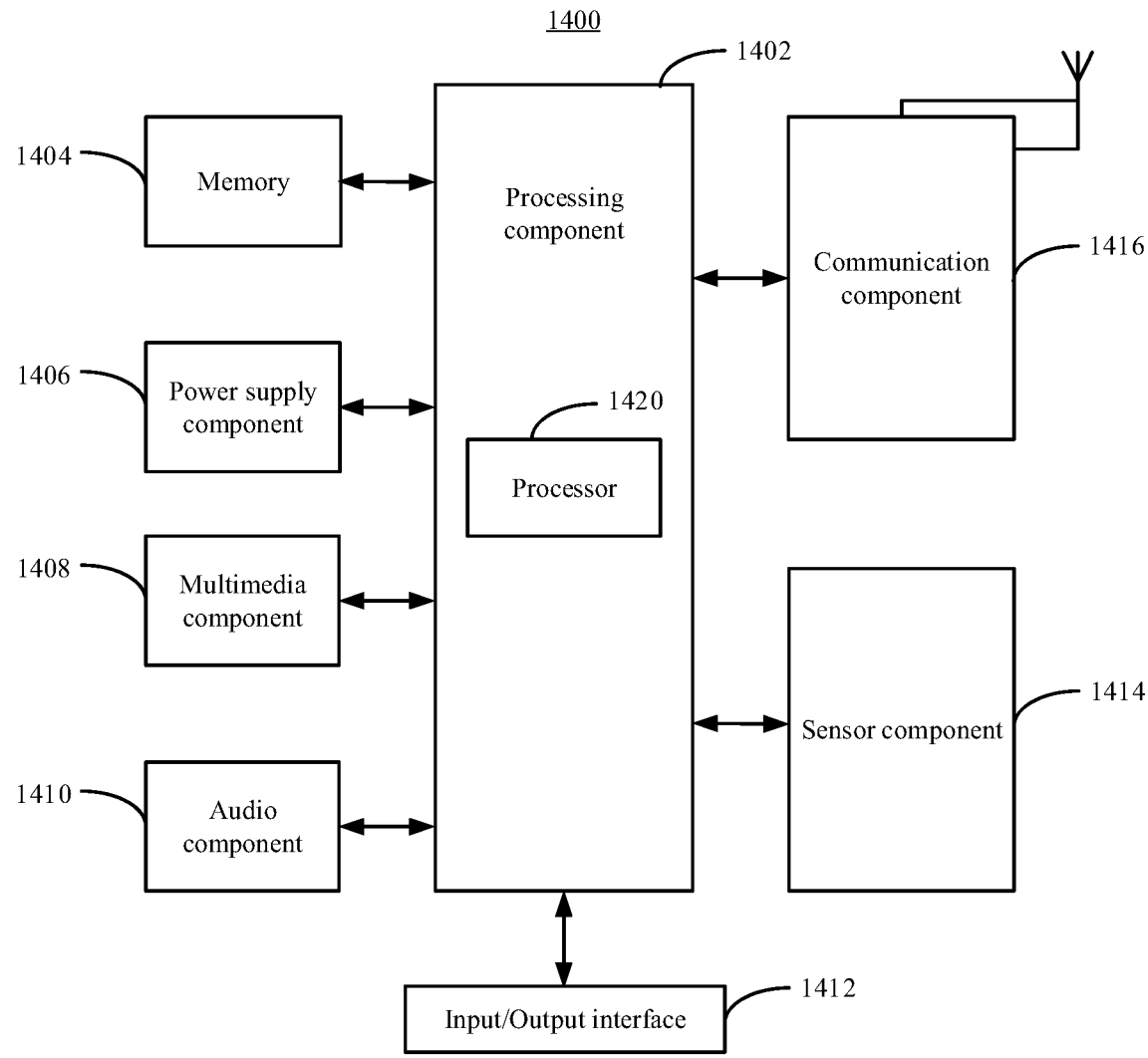
FIG. 14 is a schematic block diagram illustrating a device for instructing a delay according to an embodiment of the present disclosure.

FIG. 14 is a schematic block diagram of a device 1400 for instructing a delay according to an embodiment of the present disclosure. For example, the device 1400 may be a mobile phone, a computer, a digital broadcast terminal, a message transceiver, a game console, a tablet device, a medical device, a fitness device, a personal digital assistant, and the like.

Referring to FIG. 14, the device 1400 includes one or more of the following components: a processing component 1402, a memory 1404, a power supply component 1406, a multimedia component 1408, an audio component 1410, an input/output (I/O) interface 1412, a sensor component 1414 and a communication component 1416.

The processing component 1402 generally controls the overall operations of the device 1400, such as operations associated with display, phone calls, data communications, camera operations, and recording operations. The processing component 1402 may include one or more processors 1420 to execute instructions to complete all or part of the steps of the above method of instructing a delay. In addition, the processing component 1402 may include one or more modules that facilitate the interaction between the processing component 1402 and other components. For example, the processing component 1402 may include a multimedia module to facilitate the interaction between the multimedia component 1408 and the processing component 1402.

The memory 1404 is configured to store various types of data, supporting the operation of the device 1400. Examples of such data include instructions for any application or method operated on the device 1400, contact data, phonebook data, messages, pictures, videos, and so on. The memory 1404 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or compact disk.

The power supply component 1406 supplies power for different components of the device 1400. The power supply component 1406 may include a power supply management system, one or more power supplies, and other components associated with generating, managing and distributing power for the device 1400.

The multimedia component 1408 includes a screen that serves as an output interface between the device 1400 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1408 includes a front camera and/or a rear camera. When the device 1400 is in an operation mode, such as a shooting mode or a video mode, the front camera and/or the rear camera may receive external multimedia data. Each of the front and rear cameras may be equipped with a fixed optical lens system or have a focal length and optical zoom capability.

The audio component 1410 is configured to output and/or input audio signals. For example, the audio component 1410 includes a microphone (MIC) configured to receive an external audio signal when the device 1400 is in an operation mode, such as a call mode, a recording mode, and a voice recognition mode. The received audio signal may be further stored in the memory 1404 or transmitted via the communication component 1416. In some examples, the audio component 1410 also includes a loudspeaker for outputting an audio signal.

The I/O interface 1412 provides an interface between the processing component 1402 and a peripheral interface module which may be a keyboard, a click wheel, a button, or the like. These buttons may include, but are not limited to a home button, a volume button, a start button, and a lock button.

The sensor component 1414 includes one or more sensors for providing a status assessment in various aspects to the device 1400. For example, the sensor component 1414 may detect the open/closed state of the device 1400, as well as the relative positioning of its components, such as a display and a keypad. The sensor component 1414 may also detect a change in position of the device 1400 or of a component of the device 1400, the presence or absence of a user in contact with the device 1400, the orientation or acceleration/deceleration of the device 1400 and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some examples, the sensor component 1414 may also include an acceleration sensor, a gyro sensor, a magnetic sensor, a pressure sensor, or a temperature sensor.

The communication component 1416 is configured to facilitate wired or wireless communication between the device 1400 and other devices. The device 1400 may access a wireless network based on a communication standard, such as WiFi, 2G or 3G, or 4G LTE, or 5G NR or a combination thereof. In an example, the communication component 1416 receives broadcast signals or broadcast associated information from an external broadcast management system via a broadcast channel. In an example, the communication component 1416 also includes a near field communication (NFC) module to facilitate short range communication. For example, the NFC module may be implemented using a radio frequency identification (RFID) technology, an infrared data association (IrDA) technology, an ultrawideband (UWB) technology, a Bluetooth (BT) technology, and other technologies.

In an example, the device 1400 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above method of instructing a delay.

In an example, there is provided a non-transitory computer-readable storage medium 1404 storing instructions. The instructions may be executed by the processor 1420 of the device 1400 to complete the above method of instructing a delay. For example, the non-transitory computer-readable storage medium may be a read-only memory (ROM), a random access memory (RAM), CD-ROM, a magnetic tape, a floppy disk, and an optical data storage device and so on.

Other implementations of the present disclosure will be apparent to those skilled in the art from consideration of the specification and practice of the present disclosure herein. The present disclosure is intended to cover any variations, uses, modifications or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of methods and apparatuses provided according to the embodiments of the present disclosure. Specific examples are used herein to set forth the principles and the implementing methods of the present disclosure, and the descriptions of the above embodiments are only meant to help understand the methods and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limited to the present disclosure.

The invention claimed is:

1. A delay determination method, applied to a core network and comprising:
   in response to receiving busy instruction information from a terminal, delaying a determination process of stopping paging the terminal;
   wherein delaying the determination process of stopping paging the terminal comprises:
   delaying expiration of a first timer, wherein the expiration of the first timer triggers the core network to resend a paging signaling or a paging message to the terminal; or
   delaying expiration of a second timer, wherein the expiration of the second timer triggers the core network to stop sending a paging signaling or a paging message to the terminal;
   wherein when a number of times of resending the paging signaling or the paging message reaches a target number of times, the core network stops sending the paging signaling or the paging message to the terminal;

wherein the busy instruction information carries a busy time length,
  delaying the expiration of the first timer comprises:
    pausing the first timer by the busy time length; or
  delaying the expiration of the second timer comprises:
  pausing the second timer by the busy time length.

2. The method of claim 1, wherein
  delaying the expiration of the first timer comprises:
    in response to determining that the first timer does not expire, resetting the first timer; or
  delaying the expiration of the second timer comprises:
    in response to determining that the second timer does not expire, resetting the second timer.

3. The method of claim 2, wherein delaying the expiration of the first timer further comprises:
  upon each time the first timer is reset, increasing the number of times of resending the paging signaling or the paging message by 1.

4. The method of claim 2, further comprising:
  in response to receiving a busy ending instruction from the terminal is received, starting the first timer or the second timer.

5. A non-transitory computer readable storage medium, storing computer programs thereon, wherein the programs, when executed by a processor, cause the processor to perform the delay determination method of claim 1.

6. A method of instructing a delay, applied to a terminal and comprising:
  sending busy instruction information to a core network;
  wherein the busy instruction information is used to instruct the core network to delay a determination process of stopping paging the terminal;
  wherein at least a first subscriber identity module (SIM) card and a second SIM card are disposed in the terminal, and sending the busy instruction information to the core network comprises:
  in response to determining that an operation of the second SIM card in response to a paging signaling or a paging message conflicts with a communication operation performed by the first SIM card, sending the busy instruction information to the core network corresponding to the second SIM card;
  wherein the busy instruction information is used to instruct the core network to delay a determination process of stopping paging the second SIM card;
  wherein the busy instruction information is used to instruct the core network to delay expiration of a first timer or expiration of a second timer;
  wherein the expiration of the first timer triggers the core network to resend a paging signaling or a paging message to the terminal; and the expiration of the second timer triggers the core network to stop sending a paging signaling or a paging message to the terminal;
  wherein when a number of times of resending a paging signaling or a paging message reaches a target number of times, the core network stops sending the paging signaling or the paging message to the terminal;
  wherein the busy instruction information comprises a busy time length, and the busy instruction information is used to instruct the core network to pause the first timer by the busy time length or pause the second timer by the busy time length.

7. The method of claim 6, wherein the busy instruction information is used to instruct the core network to reset the first timer, or instruct the core network to reset the second timer.

8. The method of claim 6, further comprising:
  sending a busy ending instruction to the core network, wherein the busy ending instruction is used to instruct the core network to start the first timer or the second timer.

9. The method of claim 6, wherein the busy instruction information comprises a busy time length, and the busy instruction information is used to instruct the core network to pause the first timer by the busy time length or pause the second timer by the busy time length.

10. An electronic device, comprising:
  a processor; and
  a memory storing instructions executable by the processor,
  wherein the processor is configured to perform the method of claim 6.

11. A non-transitory computer readable storage medium, storing computer programs thereon, wherein the programs, when executed by a processor, cause the processor to perform the method of claim 6.

12. An electronic device, comprising:
  a processor; and
  a memory storing instructions executable by the processor,
  wherein the processor is configured to perform operations comprising:
  in response to receiving busy instruction information from a terminal, delay a determination process of stopping paging the terminal;
  wherein delaying the determination process of stopping paging the terminal comprises:
  delaying expiration of a first timer, wherein the expiration of the first timer triggers a core network to resend a paging signaling or a paging message to the terminal; or
  delaying expiration of a second timer, wherein the expiration of the second timer triggers the core network to stop sending a paging signaling or a paging message to the terminal;
  wherein when a number of times of resending the paging signaling or the paging message reaches a target number of times, the core network stops sending the paging signaling or the paging message to the terminal;
wherein the busy instruction information carries a busy time length,
  delaying the expiration of the first timer comprises:
    pausing the first timer by the busy time length; or
  delaying the expiration of the second timer comprises:
  pausing the second timer by the busy time length.

* * * * *